United States Patent [19]

Berke

[11] Patent Number: 5,170,190

[45] Date of Patent: Dec. 8, 1992

[54] WATER SPORTSMAN'S FACE MASK FOR VIEWING OBJECTS ABOVE AND BELOW THE LINE OF VISION

[76] Inventor: Joseph J. Berke, 2063 Long Lake Shore, West Bloomfield, Mich. 48033

[21] Appl. No.: 539,195

[22] Filed: Jun. 18, 1990

[51] Int. Cl.⁵ .......................... G02C 1/00; A61F 9/02
[52] U.S. Cl. ..................................... 351/43; 351/158; 2/430
[58] Field of Search ................ 351/43, 57, 158; 2/430

[56] References Cited

U.S. PATENT DOCUMENTS

| | | |
|---|---|---|
| 2,123,682 | 7/1938 | Wingate . |
| 2,358,348 | 9/1944 | Pierson . |
| 2,594,698 | 4/1952 | Thomas . |
| 2,618,199 | 11/1952 | Evans . |
| 2,909,959 | 10/1959 | Girden ................... 351/43 |
| 4,704,014 | 11/1987 | Carner, Jr. . |
| 4,717,249 | 1/1988 | Fischer . |
| 4,795,235 | 1/1989 | Spitzberg . |

Primary Examiner—Rodney B. Bovernick
Attorney, Agent, or Firm—Alex Rhodes

[57] ABSTRACT

A water sportsman's face mask for enabling a swimmer on or below the surface of a body of water to view objects which lie substantially above or below his normal line of vision without rotation of the swimmer's head or body. The mask comprises a frame, a lens mounted in the front of the frame, a flexible seal attached to the rear of the frame for forming a water-tight seal between the frame and the face of the swimmer, an adjustable strap for attaching the mask to the swimmer's head, and a pair of triangular prisms mounted on the lens which enable the swimmer to view objects above or below the swimmer's normal line of vision. One face of the prism is mirrorized and is in oblique relationship to the lens. In one embodiment of the invention the prisms are rotatably mounted to the frame and are selectively adjustable to a forward operative position and to a rearward inoperative position.

15 Claims, 3 Drawing Sheets

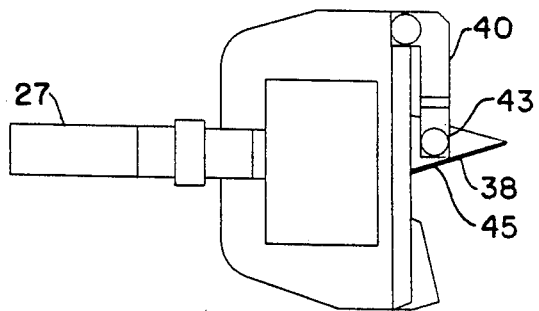
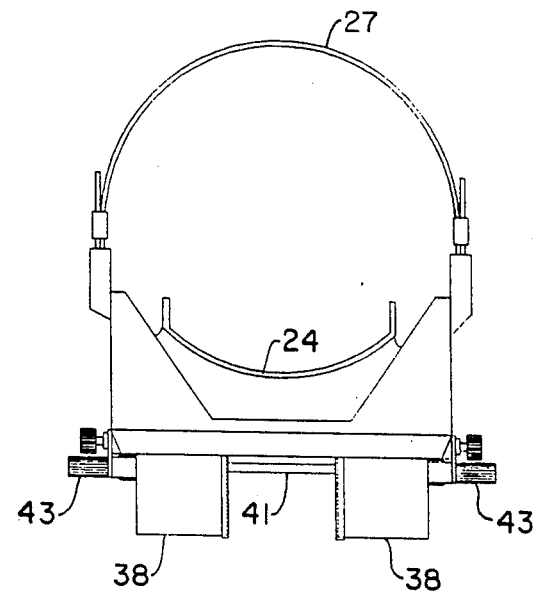
FIG. 9
FIG. 8
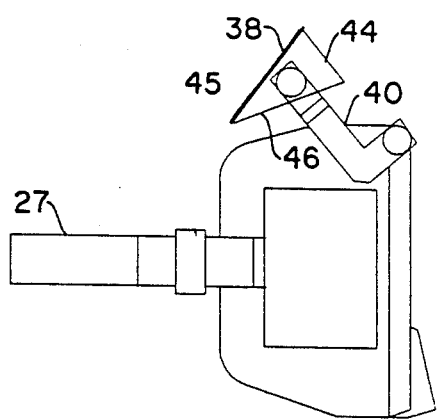
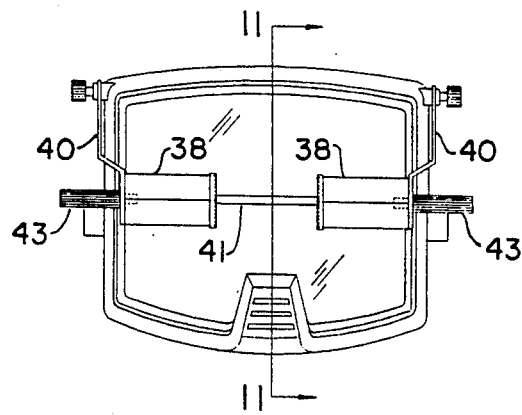
FIG. 11
FIG. 10
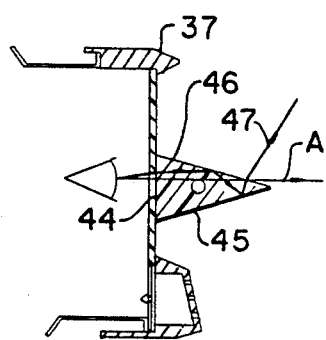
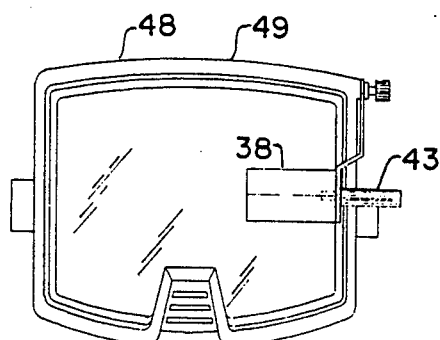
FIG. 13
FIG. 12

WATER SPORTSMAN'S FACE MASK FOR VIEWING OBJECTS ABOVE AND BELOW THE LINE OF VISION

BACKGROUND OF THE INVENTION

This invention relates to face masks which are used by water sportsmen and more particularly to a water sportsman's face mask for viewing objects above or below a swimmer in a body of water.

Diving masks and swimmer's goggles are exemplary of face masks used by water sportsmen, including, recreational swimmers, scuba divers, snorklers, surfers and spear fishermen. They seal tightly against a sportsman's face and prevent water from contacting his eyes. Some also prevent water from contacting his nose. They frequently include attached snorkels or are used with mouthpieces, breathing regulators and air tanks.

In many instances, while swimming on the surface or beneath the surface, hazards are encountered, such as, boats, debris, sharks, electric eels, men-of-war, rocks, reefs and the like. The ability of a swimmer to cope with hazards in water is diminished over his natural habitat of dry land because of the swimmer's reduced mobility and poor lighting. Consequently, it is desirable for the swimmer to have as much notice as possible of the presence of hazards.

Inasmuch as a swimmer generally swims with head erect to view the area ahead of the swimmer, he must frequently rotate his head and twist his body to view objects directly above or below him. Viewing objects above the swimmer is most difficult because of the inability to further rotate his head.

The head and body movements are tiresome, impede the swimmer's forward movement and detract from his enjoyment of the water sport. They also interfere with the use of snorkels by limiting his positions and may cause him to intake water.

From the foregoing, it is apparent that a need exists for reducing a swimmer's repetitive head and body movements and expanding his field of vision while swimming on or below the surface of a body of water.

SUMMARY OF THE INVENTION

The present invention provides these improvements by enabling a swimmer to view objects in a direction which is at a substantial angle to a swimmer's normal line of vision without rotation of the swimmer's head or twist of the swimmer's body. The invention resides in the integration of single optical prisms into a water sportsman's face mask which enable a swimmer to view objects substantially above or below the swimmer's normal line of vision when the swimmer is facing forwardly with his head erect.

In one aspect of the invention, a face mask is adapted to view objects above the swimmer. In a second aspect of the invention, a face mask is adapted to view objects below the swimmer. One benefit of the invention, in addition to the foregoing benefit, is that current face masks can be retrofitted to view objects either above or below a swimmer.

The invention comprises a frame which seals tightly on a swimmer's face, a lens mounted in the front portion of the frame for viewing objects directly ahead of the swimmer, in the direction of the swimmer's normal line of vision, an adjustable means for attaching the mask to the swimmer's head and a pair of optical prisms mounted on the mask, each having first a planar face which is adjacent to the lens, a second planar face which is in oblique relationship to said normal line of vision, and a third face which interconnects the first and second faces. The second planar face is positioned at an angle which internally reflects light rays that are at a substantial angle to the normal line of vision of the swimmer. The optical prisms may be separate and joined to the mask or may be unitarily formed with the lens of the mask.

The foregoing aspects, features and benefits of the invention, together with additional aspects, features and benefits will be more apparent from the ensuing description and accompanying drawings which describe the invention in detail.

BRIEF DESCRIPTION OF THE DRAWINGS

FIG. 8 is a top view of a diver's mask with a pair of optical prisms rotatably mounted on the mask for viewing objects above the swimmer at a substantial angle to the swimmer's normal line of vision.

FIG. 9 is a right side view of the mask of FIG. 8.

FIG. 10 is a front view of the mask of FIG. 8.

FIG. 11 is a right side view of the mask of FIG. 8, showing the optical prisms in their non-operative position.

FIG. 12 is a front view of a diver's mask with a single optical prism rotatably mounted on the mask for viewing objects above the swimmer at a substantial angle to the swimmer's normal line of vision.

FIG. 13 is a cross-sectional view taken on the line 13—13 of FIG. 10.

DETAILED DESCRIPTION OF A PREFERRED EMBODIMENT

Figure 1:
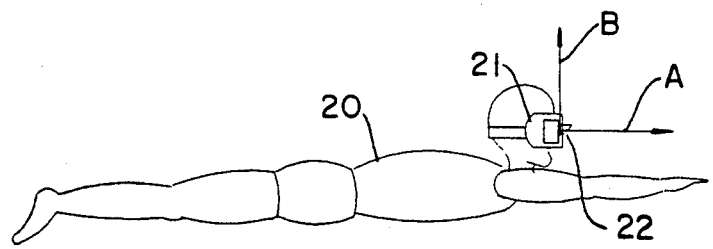
FIG. 1 is a side view of a swimmer.
Figure 3:
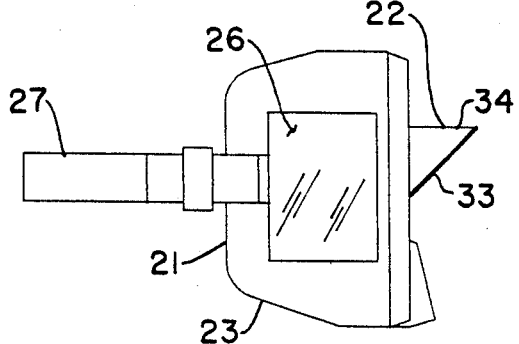
FIG. 3 is a right side view of the mask of FIG. 1.
Figure 2:
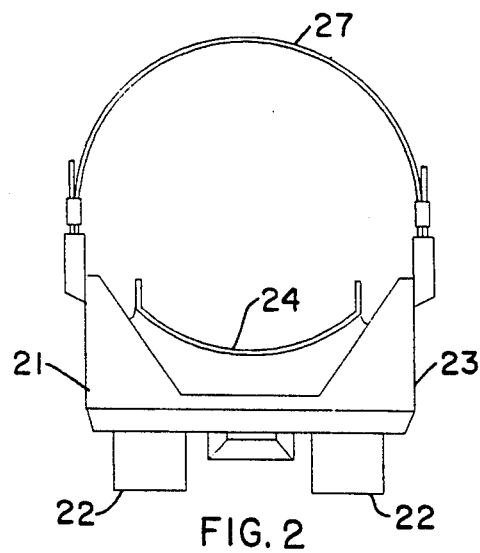
FIG. 2 is a top view of a diver's mask with a pair of optical prisms mounted on the mask for viewing objects above the swimmer at a substantial angle to the swimmer's normal line of vision.

Referring now to the drawings wherein like numerals designate like and corresponding parts throughout the several views, in FIG. 1 a swimmer 20 is shown wearing a diver's mask 21 with his head erect for viewing objects in the general direction of his normal line of vision designated by the letter "A". As used herein, the normal line of vision of a swimmer 20 means a horizontal line of vision of a swimmer 20 with his head erect as shown in FIG. 1 and the words "substantially above or below the normal line of vision" mean above or below the swimmer's normal forward field of vision.

The mask 21 has a pair of right angle optical prisms 22 which enable the swimmer 20 to view objects that lie substantially above o below the normal line of vision "A". A light ray is designated by the letter "B" in FIG. 1 which is perpendicular to the normal line of vision "A" and is reflected by the prism 22 on to the normal line of vision "A". The mask 21, which is depicted in FIGS. 2 through 5, inclusive, has a frame 23, a flexible sealing member 24 attached to the rear of the frame 23 for sealing the frame 23 on the face of the swimmer 20 to prevent an intake of water, a lens 25 mounted in the front of the frame 23 for viewing objects in the general direction of the normal line of vision "A", a pair of lenses 26 mounted in the sides of the frame 23, an adjustable strap 27 for mounting the mask 21 on the head of the swimmer 20 and a pair of optical prisms 22 mounted on the front surface of the lens 25 of the mask for viewing objects generally in the direction designated by the line "B".

Although a diver's mask 21 is shown, it is not my intention to limit my invention to divers' masks. By way of example of other types of water sportsmen's face masks, I have shown in FIG. 14 a pair of swimmers' goggles 28 having a pair of optical prisms 29 of the same type as the diver's mask 21 of FIGS. 2 and 3.

The optical prisms 22 are positioned on the mask 21, as shown in the solid outline in FIG. 5, on or about the eye level of the swimmer 20, or slightly below the eye level as shown in phantom outline 30. One face 31 of each prism 21 is adjacent to the lens 25 and has a raised peripheral portion S2 which is adhesively bonded to the lens 25. A second face 33 is mirrorized and is in angular relationship to the lens 25. The third face 34 interconnects the first 31 and second 33 faces.

The prisms 22 are made of an optically clear glass or plastic and the three faces 31, 32, 33 are polished to minimize distortion and losses in light transmissibility. Suitable polymers include polycarbonate and methyl methacrylate, by way of example, the polymers sold under the trademarks, LEXAN and LUCITE. The prisms 21 may be separate and joined to the mask 21 as shown in FIG. 5 or formed unitarily with the front lens 25.

Figure 5:
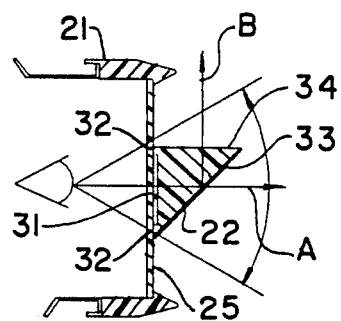
FIG. 5 is a cross-sectional view taken on the line 5—5 of FIG. 4.
Figure 4:
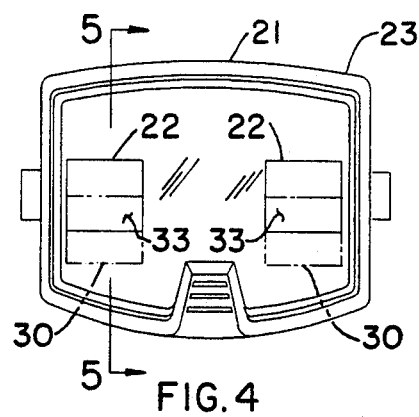
FIG. 4 is a front view of the mask of FIG. 1.

With reference to FIG. 5 the path of a light ray $u_I$ which enters and leaves an optical prism is governed by Snell's Law. Snell's Law states that when a light ray passes from one medium to another:

The ratio of the sine of the angle of incidence (measured from the normal) to the sine of the angle of refraction (also measured from the normal) is a constant that is independent of the angle of incidence.

Accordingly, when a light ray passes through the interface between any two media I and II the following relationship applies.

$$u_I \sin \theta_I = u_{II} \sin \theta_{II} \text{ (Snell's Law)}$$

Where $u_I$ and $u_{II}$ are the absolute refractive indices of media I and II and $\theta_I$ and $\theta_{II}$ are the angles between the normal and rays in media I and II.

The absolute refractive index (commonly referred to as the "refractive index") of dry air is 1.00029 and is usually treated as unity. From Snell's Law, it should be noted that when a light ray enters a denser medium it is refracted towards the normal and when a ray enters a less dense medium it is refracted away from the normal. Because of this phenomenom, reflection can occur inside a prism for light rays having large angles of incidence.

The minimum angle of incidence for internal reflection is commonly referred to as the "critical angle". It is important to note that internal reflection can only occur within a media of higher refractive index at a surface of contact with a medium of lower refractive index. Critical angles vary with materials and can be easily determined by Snell's law where:

$$\theta_c = \arcsin u_I/u_{II} \text{ (critical angle)}$$

and $u_I$ must be greater than $u_{II}$

For a methyl methacrylate prism (u=1.49) immersed in water (u=1.33), the critical angle for internal reflection to occur is 63.2 degrees. It therefore follows that for the prism 22 of the embodiment 21 shown in FIGS. 2 through 5, rays at angles of incidence of less than 63.2 degrees will not be internally reflected because of refraction. However, internal reflection for rays at angles of incidence of less than 63.2 degrees can occur independently of refraction by mirrorizing the angular face 33 of the prism 22.

It should be noted that there is no refraction of a light ray which lies on the normal line of vision "A" at the first prism face 31 because the angle of incidence of the ray is zero. It should also be noted that without mirrorizing the angular face 33, some light rays would not be internally reflected for the prism 22 of FIG. 5, because their angles of incidence would be less than the critical angle of 63.2 degrees. As an alternative to mirrorizing the face 33, the angle of the face 33 could be revised to increase the angles of incidence of the rays to 63.2 degrees or greater.

Figure 7:
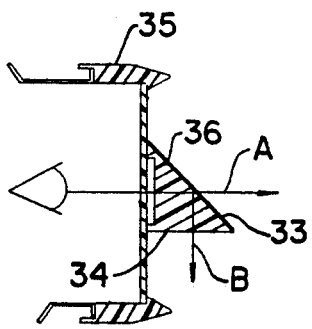
FIG. 7 is a cross-sectional view taken on the line 7—7 of FIG. 6.
Figure 6:
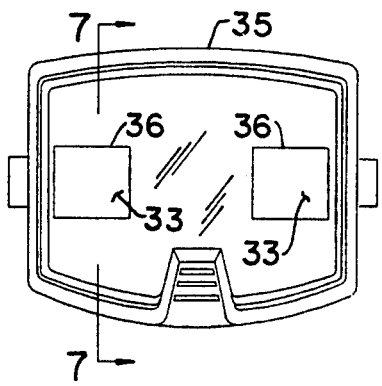
FIG. 6 is a front view of a diver's mask with a pair of optical elements mounted on the mask for viewing objects below the swimmer at a substantial angle to the swimmer's normal line of vision.

An embodiment 35 is shown in FIGS. 6 and 7 for viewing objects which lie substantially below the swimmers' normal line of vision "A". In this embodiment 35, the optical prisms 22 of FIGS. 2 through 5 are merely inverted to internally reflect rays from objects below the normal line of vision "A".

With reference to FIGS. 8 through 11, inclusive, a diver's mask 37 is shown wherein a pair of isoceles prisms 38 are rotatably mounted on a frame 39 which are adjustable to an operative position in front of the mask 38 and to an inoperative position above the mask 37. One benefit of this embodiment 37 is that the prisms 38 are out of sight of a user at the inoperative position shown in FIG. 10.

The isosceles prisms 38 are interconnected at their inner sides with a slender cylindrical rod 41 and are rotatably mounted at their outer sides with a pair of links 42. One end portion of each link 42 is attached to the outer side of a prism 38 and the other end portion of the link 42 is attached to the side of the frame 39. A slender cylindrical handle 43 extends outwardly from the outer side of each of the prisms 38 for adjusting the prisms between the operative and inoperative positions.

Figure 14:
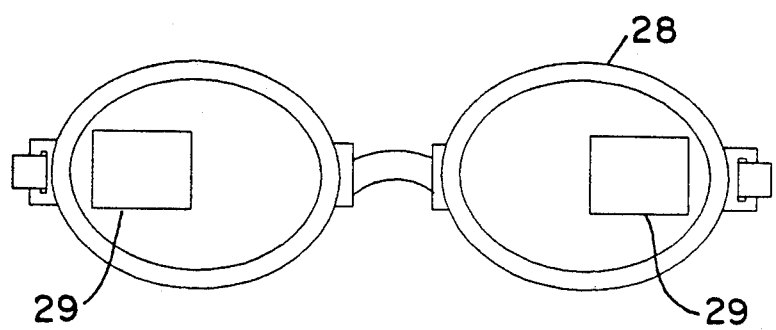
FIG. 14 is a front view of a pair of swimmers' goggles which embody my invention.

In the operative position shown in FIG. 13, a face 44 of each prism 38 is adjacent to the lens 25, a second face 45 is mirrorized and is oblique to the lens 25 and a third face 46 interconnects the first 44 and second faces 45. The path of a light ray 47 for this embodiment 37 is illustrated in FIG. 13. It will be observed that the ray 47 is double reflected inside of the prism. In FIGS. 13 and 14 an embodiment 48 is shown wherein only one isosceles prism 38 is rotatably attached to the frame 49 of a diver's mask 48.

From the foregoing it will be appreciated that my invention reduces repetitive head and body movements of a swimmer by enabling the swimmer to observe objects above or below the swimmer which are substantially above the normal line of vision of t he swimmer.

Although but several embodiments of my invention have been illustrated and described, it is apparent that other embodiments can be derived by mere changes in material, shape, arrangement and substitution of equivalent parts without departing from the spirit thereof.

I claim:

1. A face mask for viewing objects substantially above or below the normal forward field of vision of a swimmer, comprising: a frame, said frame having an open front portion for receiving a lens, a flexible member attached to the rear portion of the frame for providing a water-tight seal between said frame and the face of a swimmer, a lens mounted in the open front portion of said frame for enabling said swimmer to view objects ahead of said swimmer in the direction of the swimmer's normal forward line of vision, a means for attaching said mask to the head of said swimmer, and a single optical element mounted on the front of said lens, said optical element being adapted for enabling said swimmer to view objects outside of the swimmer's normal forward field of vision in the direction of a second line of vision which is substantially vertical to the normal forward line of vision of said swimmer, said optical element being comprised of a first planar surface and second substantially totally internally reflecting planar surface disposed at an acute angle equal to or greater than the critical angle with respect to said first planar surface such that the rays entering said optical element are substantially totally internally reflected by said second surface.

2. The face mask recited in claim 1 further comprising a second optical element, said second element also being adapted for enabling said swimmer to view objects outside of the swimmer's normal forward field of vision in the direction of the second line of vision which is substantially vertical to the normal forward line of vision of said swimmer and comprised of a first planar surface and second substantially totalling internally reflecting planar surface disposed at an acute angle with respect to said first planar surface.

3. The face mask recited in claim 1 wherein said optical element enables said swimmer to view objects substantially above the normal forward field of vision of said swimmer.

4. The face mask recited in claim 1 wherein said optical element enables said simmer to view objects substantially below the normal forward field of vision of said swimmer.

5. The face mask recited in claim 1 wherein said optical element is a prism.

6. The face mask recited in claim 5 wherein said prism is formed unitarily with said lens.

7. The face mask recited in claim 5 further comprising said prism having a first planar face which is adjacent to said lens, a second planar face which intersects said first planar face and is disposed at an oblique angle to said first planar face and a third planar face which intersects said first and second faces.

8. The face mask recited in claim 7 wherein said angle between said first and second planar faces is at least 63.2 degrees.

9. The face mask recited in claim 7 wherein said angle between said first and second planar faces is less than 63.2 degrees.

10. The face mask recited in claim 7 wherein said second face is mirrorized.

11. The face mask recited in claim 10 said prisms are isosceles triangles.

12. A face mask for viewing objects substantially above or below the normal forward field of vision of a swimmer, comprising: a frame, said frame having an open front portion for receiving a lens, a flexible member attached to the rear portion of the frame for providing a water-tight seal between said frame and the face of a swimmer, a lens mounted in the open front portion of said frame for enabling said swimmer to view objects ahead of said swimmer in the direction of the swimmer's normal line of vision, a means for attaching said mask to the head of said swimmer, and a pair of triangular prisms mounted on said mask for enabling said swimmer to view objects above or below the normal field of vision in the direction of a second line of vision which is substantially vertical to the normal line of vision of said swimmer, each of said prisms having a first planar face which is adjacent to said lens, a second mirrorized planar face which is oblique to said lens and a third planar face which interconnects said first and second planar faces.

13. A face mask for viewing objects substantially above or below the normal forward field of vision of a swimmer, comprising: a frame, said frame having an open front portion for receiving a lens, a flexible member attached to the rear portion of the frame for providing a water-tight seal between said frame and the face of a swimmer, a lens mounted in the front portion of said fame for enabling said swimmer to view objects ahead of said swimmer in the direction of the swimmer's normal line of vision, a means for attaching said mask to the head of said swimmer, a link rotatably attached at one end portion thereof to a side of said frame; a prism attached to the other end portion of said link, said prism being rotatable with said link to an operable position ahead of said lens and to an inoperative position above said lens, for enabling said swimmer to view objects, in said operative position, in the direction of a second line of vision which is substantially vertical to the normal line of vision of said swimmer.

14. A face mask for viewing objects substantially above or below the normal forward field of vision of a swimmer, comprising; a frame, said frame having an open front portion for receiving a lens, a flexible member attached to the rear portion of the frame for providing a water-tight seal between said frame and the face of a swimmer, a lens mounted in the open front portion of said frame for enabling said swimmer to view objects ahead of said swimmer in the direction of the swimmer's normal line of vision, a means for attaching said mask to the head of said swimmer, and a pair of triangular prisms rotatably mounted on said lens for enabling said swimmer to view objects above or below the normal field of vision in the direction of a second line of vision which is substantially vertical to the normal line of vision of said swimmer, each of said prisms having a first planar face which is adjacent to said lens, a second mirrorized planar face which is oblique to said lens and a third planar face which interconnects said first and second planar faces and adjustably positionable to an operative position in front of said lens and to an inoperative position above said lens.

15. The face mask recited in claim 14 wherein said prisms are interconnected.

* * * * *

UNITED STATES PATENT AND TRADEMARK OFFICE
CERTIFICATE OF CORRECTION

PATENT NO. : 5,170,190
DATED : December 8, 1992
INVENTOR(S) : Joseph J. Berke

It is certified that error appears in the above-identified patent and that said Letters Patent is hereby corrected as shown below:

Column 1, line 11, change "swimmer's" to --swimmers'--

Column 2, line 66, change "o" to --or--

Column 3, line 26, change "S2" to --32--

Column 5, line 46, change "simmer" to --swimmer--

Column 6, line 1, after claim 10, add --wherein--

Column 6, line 30, change "fame" to --frame--

Signed and Sealed this

Nineteenth Day of October, 1993

Attest:

BRUCE LEHMAN

*Attesting Officer*      *Commissioner of Patents and Trademarks*